(12) United States Patent
Wildhagen

(10) Patent No.: US 7,715,567 B2
(45) Date of Patent: May 11, 2010

(54) NOISE REDUCTION IN A STEREO RECEIVER

(75) Inventor: Jens Wildhagen, Weinstadt (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 11/505,939

(22) Filed: Aug. 18, 2006

(65) Prior Publication Data

US 2006/0280310 A1 Dec. 14, 2006

Related U.S. Application Data

(63) Continuation of application No. 09/993,092, filed on Nov. 6, 2001, now Pat. No. 7,110,549.

(30) Foreign Application Priority Data

Nov. 8, 2000 (EP) .................................. 00124466

(51) Int. Cl.
  *H04H 40/72* (2008.01)
  *H04H 20/47* (2008.01)
  *H04H 40/81* (2008.01)
  *H04B 15/00* (2006.01)
  *G10L 19/00* (2006.01)
(52) U.S. Cl. ........................ 381/13; 381/94.2; 381/94.3; 381/2; 381/11; 381/12; 704/200.1
(58) Field of Classification Search ............... 381/2–13, 381/94.1, 94.2, 94.3; 704/200.1
See application file for complete search history.

(56) References Cited

U.S. PATENT DOCUMENTS

| 5,068,896 | A | * | 11/1991 | Short ........................... 381/13 |
| 5,161,210 | A | * | 11/1992 | Druyvesteyn et al. ....... 704/200 |
| 5,253,299 | A | * | 10/1993 | Ishida et al. .................. 381/13 |
| 5,703,999 | A | | 12/1997 | Herre et al. |
| 5,812,672 | A | | 9/1998 | Herre et al. ..................... 381/2 |
| 5,873,065 | A | | 2/1999 | Akagiri et al. .............. 704/500 |
| 6,405,163 | B1 | * | 6/2002 | Laroche ....................... 704/205 |
| 7,110,549 | B2 | * | 9/2006 | Wildhagen ................... 381/13 |

FOREIGN PATENT DOCUMENTS

CA 2 118 402 12/1993

(Continued)

*Primary Examiner*—Devona E Faulk
(74) *Attorney, Agent, or Firm*—Oblon, Spivak, McClelland, Maier & Neustadt, L.L.P.

(57) ABSTRACT

A method of denoise a stereo signal comprising a stereo sum signal and a stereo difference signal, performs a frequency selective stereo to mono blending based on the masking effect of the human auditory system. Therefore, a stereo signal noise reducer, comprising a first filter bank (1) to split the stereo difference signal (l–r) into a plurality of subbands, respective first multipliers ($C_O, \ldots, C_N$) to weight each of the subbands of the stereo difference signal with a respective corresponding control signal ($C_O, \ldots, C_N$), and a first adder (3) to sum all weighted subbands of the stereo difference signal (l–r) to build a frequency selective weighted stereo difference signal (diff), within which a number and width of the subbands obtained via the first filter bank (1) are choosen according to the properties of the human auditory system, further comprises a weighting factor determination unit which determines a respective control signal ($C_O, \ldots, C_N$) frequency selective based on the masking effect of the human auditory system.

21 Claims, 3 Drawing Sheets

FOREIGN PATENT DOCUMENTS

| | | |
|---|---|---|
| DE | 42 17 276 C1 | 4/1993 |
| DE | 44 00 865 | 7/1995 |
| EP | 0 418 036 | 3/1991 |
| EP | 0 642 719 B1 | 3/1995 |
| EP | 0 955 732 | 11/1999 |
| JP | 3-179828 | 8/1991 |
| WO | WO 93/25015 A1 | 12/1993 |

\* cited by examiner

NOISE REDUCTION IN A STEREO RECEIVER

This application is a Continuation of and claims the benefit of priority under 35 U.S.C. §120 from U.S. Ser. No. 09/993,092, filed Nov. 6, 2001, and claims the benefit of priority under 35 U.S.C. §119 from European Patent Application priority document 00124466.4 filed in Europe on Nov. 8, 2000.

BACKGROUND OF THE INVENTION

Field of the Invention

The present invention relates to a method to denoise a stereo signal and to a stereo signal noise reducer working according to said method.

FM broadcasting is currently the most important broadcast system in the world. Analogue broadcast receivers have been developed for a long time with the result of highest performance receivers. New technology offers the possibility to use new algorithms for the reception of FM broadcast signals. In particular, the increasing processing power and decreasing costs of digital processors (DSPs) offer possibilities to process analogue broadcast systems like FM and AIM digitally. The digital signal processing of analogue systems offers many advantages. The receiver size can be decreased by integration of functionality into one IC and digital broadcast systems like DRM or DAB can be integrated into the same LSI.

In FM broadcasting a multiplex signal is frequency modulated. FIG. 4 shows the spectrum of a multiplex signal. The multiplex signal consists of a sum signal and an amplitude modulated difference signal with suppressed carrier. The sum signal contains the information of the left+right audio signal and the difference signal contains the information of the left−right audio signal. To allow a demodulation of the amplitude modulated difference signal a pilot carrier is added to the multiplex signal.

In mobile FM receivers the reception situation is often bad. Current FM receivers switch from stereo reception to mono reception to gain a signal to noise ratio (SNR) of about 19 dB based on the fieldstrength and multipath detection. Such a denoising is based on the fact that the frequency demodulator output noise power spectral density is increasing squared to the frequency, i. e. that the mono signal which is equal to the stereo sum signal contains less noise than the stereo difference signal which is transmitted in a higher frequency range.

Since the switching from stereo to mono is mostly clearly audible, most FM receivers for mobile reception use a sliding stereo to mono transition. Such a sliding stereo to mono blending is disclosed in DE 44 00 865 C2 according to which the stereo channel separation might be continuously reduced dependent on information about the program type as well as a noise level within the signal and/or the fieldstrength of the frequency modulated RF-signal. Further, U.S. Pat. No. 5,253,299 and EP 0 955 732 A1 disclose to divide the stereo difference signal into several subbands and to perform the stereo to mono blending, i. e. the reduction of the stereo difference signal, independently in each subband. Such a frequency selective stereo to mono blending improves the signal to noise ratio and the channel separation of a FM receiver, especially when low RF signal amplitudes are received. However, all these systems have in common that the reception conditions are the main factor for performing the denoising stereo to mono blending which might lead to an unwanted reduction of the channel separation in many cases.

Therefore, it is the object underlying the present invention to provide an improved method to denoise a stereo signal and an improved stereo signal noise reducer.

The method to denoise a stereo signal comprising a stereo sum signal and a stereo difference signal according to the present invention is characterized by a frequency selective stereo to mono blending based on the masking effect of the human auditory system.

The stereo signal noise reducer according to the present invention comprises a first filter bank to split the stereo difference signal into a plurality of subbands, respective first multipliers to weight each of the subbands of the stereo difference signal with a respective corresponding control signal and a first adder to sum all weighted subbands of the stereo difference signal to build a frequency selective weighted stereo difference signal, and is characterized in that the number and width of the subbands obtained via the first filter banks are chosen according to the properties of the human auditory system, and by a weighting factor determination unit which determines a respective control signal frequency selective based on the masking effect of the human auditory system.

Preferred embodiments of the method to denoise a stereo signal and the stereo noise reducer according to the present invention which are defined in independent claims 1 and 15, respectively, are respectively defined in the following subclaims.

Therewith, according to the present invention, noise is suppressed in the audio signal so that it is not audible anymore. Therefore, according to the present invention psychoacoustical models are considered for denoising the stereo signal. According to the present invention the masking effect of the human auditory system is exploited to reduce the audible noise and to increase the left/right channel separation at a certain fieldstrength. The present invention uses the effect of masking according to which a probe signal which is audible in absolute silence is not audible in the presence of another signal, (namely the masker, as a parameter for the frequency, selective stereo to mono blending, since the masker can mask another, weaker (probe) signal which will remain inaudible as long as it lies below the masking threshold.

FIG. 3 depicts the simultaneous masking threshold for narrow band noise maskers at 250 Hz, 1 kHz and 4 kHz with a sound pressure level (SPL) of 40 dB, 60 dB and 80 dB. The absolute threshold of the masking for a masker with 80 dB SPL is plotted with a slashed line.

According to the invention preferably the noise included in the stereo signal is used as probe signal and an audio component of the stereo signal as mask signal or masker.

Further, according to the present invention preferably the frequency selectivity is achieved be dividing the audio signal into subbands which number is preferably determined according to the properties of the human auditory system as well as the width of a respective subband.

Therewith, according to the present invention the effect is used that the human ear summarizes tones with a certain bandwidth, the so-called critical bandwith, to one entire sound intensity. Tones that are out of the critical bandwidth do not contribute to the masking threshold of the critical band. The perceptible audio range can be devided into at least 24 critical bands. Therefore, according to the present invention the denoising of the difference signal is preferably done by splitting the difference signal into at least 24 subband signals.

Still further, according to the present invention preferably every subband of the stereo difference signal is attenuated which noise component lies above a signal component of a subband of the audio signal corresponding to that of the stereo difference signal so that the noise component of the subband of the stereo difference signal lies below a respective absolute threshold of masking. The stereo difference signal is double sideband modulated so that the in phase component contains ideally signal+noise and the in quadrature component contains only noise. In practical implementations a crosstalk from the in phase component of the modulated difference signal to the in quadrature component of the difference signal is most likely. In other words, the in phase component contains signal+noise and the in quadrature component contains noise+few signal. However, the in phase and the in quadrature components of the modulated difference signal still give a proper indication to the signal and the noise power in the difference signal. Therefore, the frequency selective stereo to mono blending based on the masking effect of the human auditory system can also be described as a stereo to mono blending based on psychoacoustical models and on the information of the signal and noise power in the audio signal. As mentioned above, the stereo to mono blending according to the present invention is performed by denoising of the difference signal before the stereo difference signal is added/subtracted to/from the stereo sum signal.

According to the present invention, further preferably an attenuation factor of a respective subband is determined by dividing the signal component corresponding to the subband of the audio signal by the noise component of the subband of the stereo difference signal.

Therewith, according to the present invention preferably the noise power in each subband of the difference signal is calculated and compared with the signal power in each subband of the audio signal. The subbands of the difference signal with a noise power above the absolute threshold of masking are attenuated. The attenuator reduces the noise power to approximately the level of the absolute threshold of masking.

A respective influence factor is preferably subtracted from the attenuation factor of the respective subband to reduce the influence of the noise in the audio signal power to the calculation of the attenuation. The attenuation factor itself might be limited to values between 0 and 1. In case of very bad reception conditions a limitation of the attenuation factor to values<1 reduces the effect of modulation of the stereo-effect. Therefore, the limitation might vary depending on the reception situation and/or the variation speed of the attenuation factors.

According to the present invention, the noise component of a subband of the difference signal is preferably determined on basis of its rms (root mean square) noise power. Further, the noise component of a subband of the stereo difference signal is preferably determined by weighting its noise power according to a respective corresponding absolute threshold of masking, and/or a factor depending on the reception situation, e. g. the fieldstrength of the received fm signal, a volume of output sound, a background noise level, and/or a speed of a vehicle within which the stereo signal is reproduced. The distortion in spoken programs can be reduced by weighting the subbands noise power depending on the ratio of the signal and noise power in the difference signal (in phase and in quadrature signal of the modulated difference signal).

The audio component corresponding to a subband of the stereo difference signal is preferably determined according to an audio signal power which is determined based on an extraction of the root of an averaged sum of a respective squared subband signal of an in phase component of the stereo difference signal and a respective squared subband signal of the stereo sum signal. J Preferably the squared subband signal of the in phase component of the stereo difference signal is weighted with a weighting factor depending on the reception situation, e.g. as explained below.

This weighting with a weighting factor which preferably has a range in-between 0 and 1 is performed to avoid errors in the calculation of the rms of the audio signal at low SNR. As mentioned above, the stereo sum signal contains only few noise power compared to the difference signal. Further, generally, the signal power and the sum signal is higher than the signal power in the difference signal. The audio signal power can be calculated with stereo sum signal: (l +r)
stereo difference signal: (l −r)

for each subband to $(l+r)^2+(l-r)^2=2(l^2+r^2).$

The weighting of the difference signal with the weighting factor<1 reduces the influence of the noise distortions from the difference signal to the calculated signal power. On the other hand, such a weighting factor results in errors in the calculation of the signal power. A compromise between the influence of the noise power from the difference signal and the signal power from the difference signal needs to be found. A possible solution is the usage of variable weighting factors depending on the reception situation, for example a single use or a combination of the following factors: fieldstrength of the received fm signal, multipath, signal amplitude power in the sum/difference signal, signal amplitude power of the audio signal, speed of a vehicle within which the stereo signal is reproduced, and/or a background noise level etc.

The rms signal of the signal and the noise is respectively calculated, since a rms filtered control signal results in a better audible audio signal. For the i same reason, rms detectors are the best choice in companders, since the human ear perceives the sound intensity logarithmic.

A computer program product according to the present invention comprises computer program means adapted to perform the above discussed method steps when it is executed on a computer or digital processor.

As mentioned above, a stereo signal noise reducer according to the present invention comprises circuit elements to realize the noise reduction according to the method of the present invention.

Further objects, advantages and features of the present invention will be better understood from the following detailed description of a preferred embodiment thereof taken in conjunction with the accompanying drawings, wherein:

FIG. 1 depicts a digital receiver for FM broadcast with the psychoacoustically motivated stereo to mono blending according to the present invention.

Figure 4:
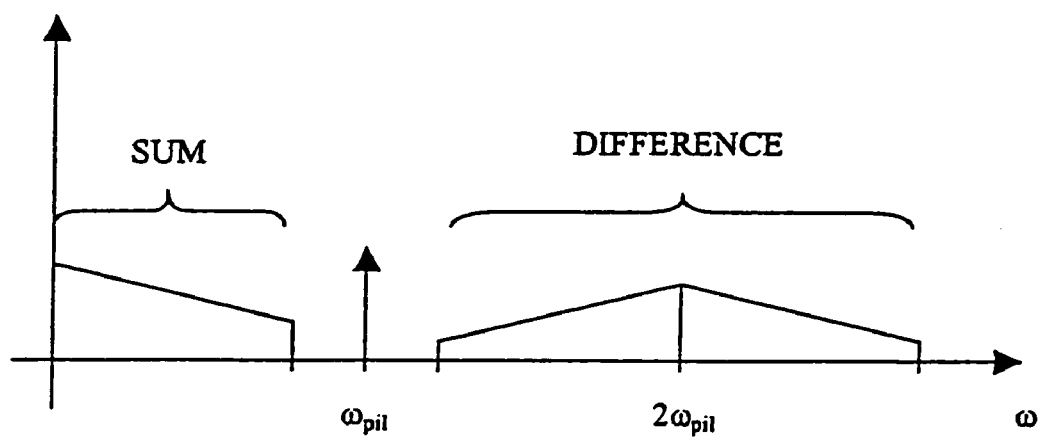
FIG. 4 shows the spectrum of a stereo multiplex signal.

A received stereo broadcast signal passes through a front end stage 14, an analogue to digital converter with IQ generator 15 to be supplied to a FM-demodulator 16 which outputs the stereo multiplex signal which spectrum is shown in FIG. 4. This stereo multiplex signal is supplied to a lowpass filter 20 which outputs the stereo sum signal, i.e. the signal 1+r, to a matrix circuit 21 which also receives the filtered stereo difference signal diff to output the signal for the left channel l and the output signal for the right channel r.

The stereo multiplex signal output from the FM-demodulator 16 is further input to the digital phase locked loop circuit (PLL) 17 which outputs an I signal which is in phase to the 38 kHz subcarrier to a second mixer 18 which additionally receives the stereo multiplex signal to demodulate the amplitude modulated stereo difference signal l−r which is gained by filtering the output signal of the second mixer 18 with a second lowpass filter 19. The DPLL 17 further outputs a Q-signal which is in quadrature to the 38 kHz subcarrier to a first mixer 6 which also additionally receives the stereo multiplex signal to derive the in quadrature component of the stereo difference signal by lowpass filtering with a first lowpass filter 7.

The stereo sum signal l+r, the stereo difference signal l−r and the in quadrature component of the difference signal are subband filtered for the calculation of the signal and the noise power. The subband filtering with filters with a bandwidth identical to the critical bandwidth of the human auditory system is described further below in connection with FIG. 2. Of course, also other implementations for the filter banks are possible.

Each of the N+1 output signals of the first filter bank 1 which filters the stereo difference signal l−r according to the human auditory system is fed to a respective first multiplier $2_O, \ldots, 2_N$ which weights each of the subbands of the stereo difference signal with a respective corresponding control signal $C_O, \ldots, C_N$ before each of the weighted subband signals is supplied to a first adder 3 to sum all weighted subband signals of the stereo difference signal to build a frequency selective weighted stereo difference signal diff which is supplied to the matrix circuit 21.

In the following the calculation of a respective control signal $C_O, \ldots, C_N$ is described by way of example for the control signal $C_O$ which is used to filter the first of the N+1 subbands with index 0.

The respective rms of the noise and audio subband signals gets calculated. The respective filter for the calculation of each rms signal is preferably a respective non-linear filter with variable attack, hold and realease time constants and basically consists of a squaring unit followed by a lowpass filter and a unit to take the square root of the lowpass filtered signal.

The rms signal of the subband noise is obtained via a respective first rms filter 90 by rms filtering an output signal of a second filter bank 8 splitting the in quadrature component of the difference signal into subbands corresponding to the first filter bank 1, i.e. generating subbands corresponding to those generated by the first filter bank. To take the absolute threshold of a respective sub-band into consideration the rms signal of the subband noise is multiplied with a variable $M_0$ by a respective second multiplier $10_0$. As mentioned above, this variable Mn may also respectively depend on the reception situation and/or the signal and noise power of the difference signal as explained above.

The rms of the corresponding audio subband signal is obtained with a respective second rms filter $12_0$ by squaring the corresponding output signal of the first filter bank 1, i.e. the audio signal corresponding to the subband with index 0, squaring the corresponding output signal of a third filter bank 11 which divides the stereo sum signal l+r in the same manner as the first filter bank 1 divides the stereo difference signal l−r, adding those both corresponding output signals of the first and third filter banks, lowpass filtering the resulting sum, and taking the root of the lowpass filtered signal. To avoid errors in the calculation of the rms of the audio subband signal at low SNR, the rms of the subband difference signal is multiplied by a respective multiplier $13_0$ with a variable $0 \leq W_n \leq 1$, here $0 \leq W_0 \leq 1$, which depends on the reception situation as explained above.

The respective rms of the audio signal is divided by the respective corresponding rms of the noise in a respective division unit $4_0$ to calculate the attenuation $C_0$ of the corresponding subband difference signal by subtracting a correction factor $K_0$ which reduces the influence of noise in the signal power to the control signal. As mentioned above, the control signal $C_0$ itself is limited to values between 0 and 1. In case of very bad reception conditions a limitation of the control signal to values<1 reduces the effect of the modulation of the stereo effect. So the limitation should be depending on the reception situation and/or the signal and noise power of the difference signal as explained above.

Figure 1:
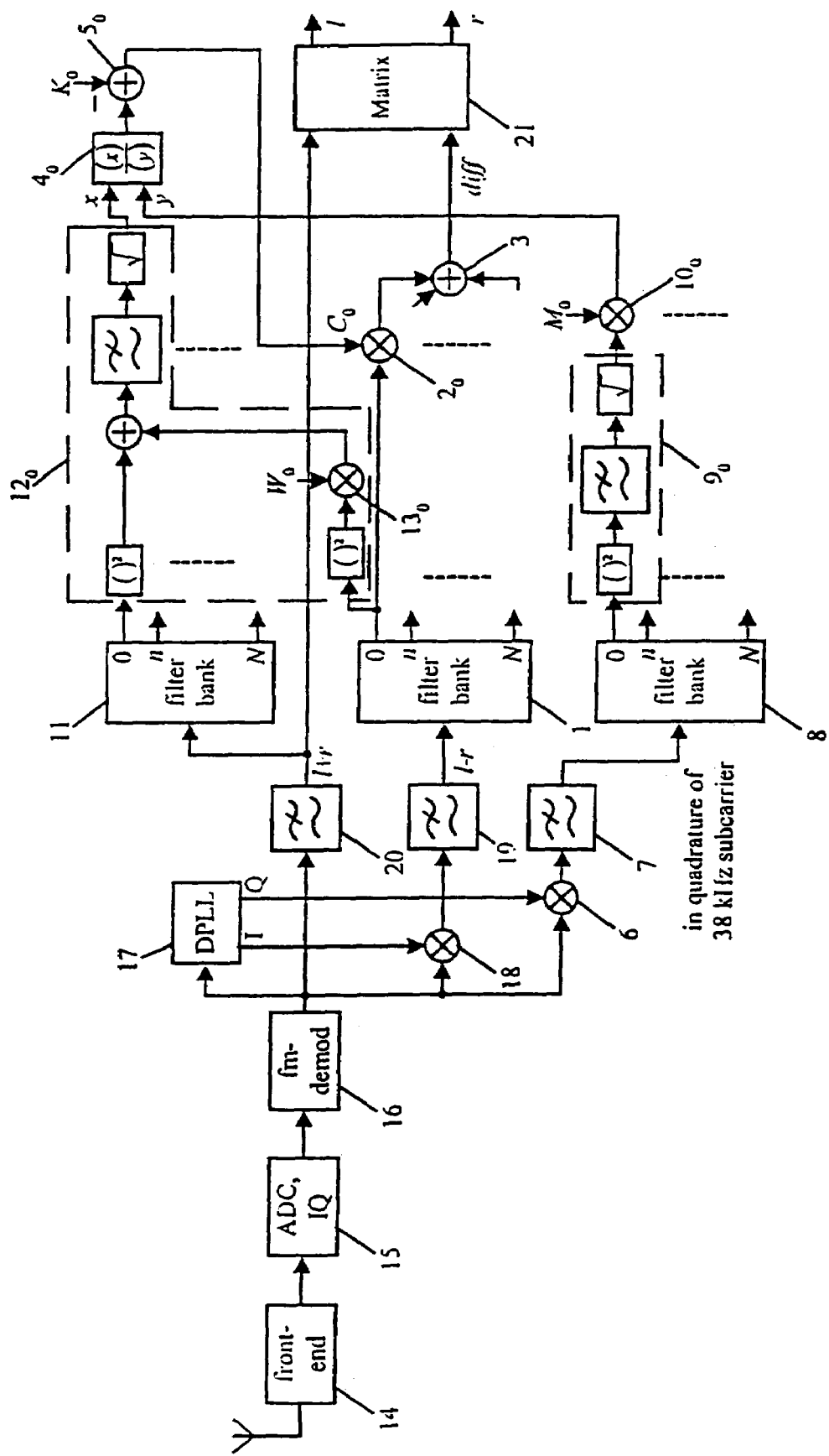
FIG. 1 shows a digital receiver for FM broadcast with psychoacoustically motivated stereo to mono blending according to the present invention.

For the sake of simplicity delay elements to equalize the filters group delays are not shown in FIG. 1.

Preferably, the subband bandwidth of the third filter bank 11 is slightly larger than the bandwidth of the first and second filter banks 1, 8 in order to avoid misfunctions in case of audio signals with very narrow bandwidth that are located in the transition region from one subband to the neighbouring subband.

Figure 2:
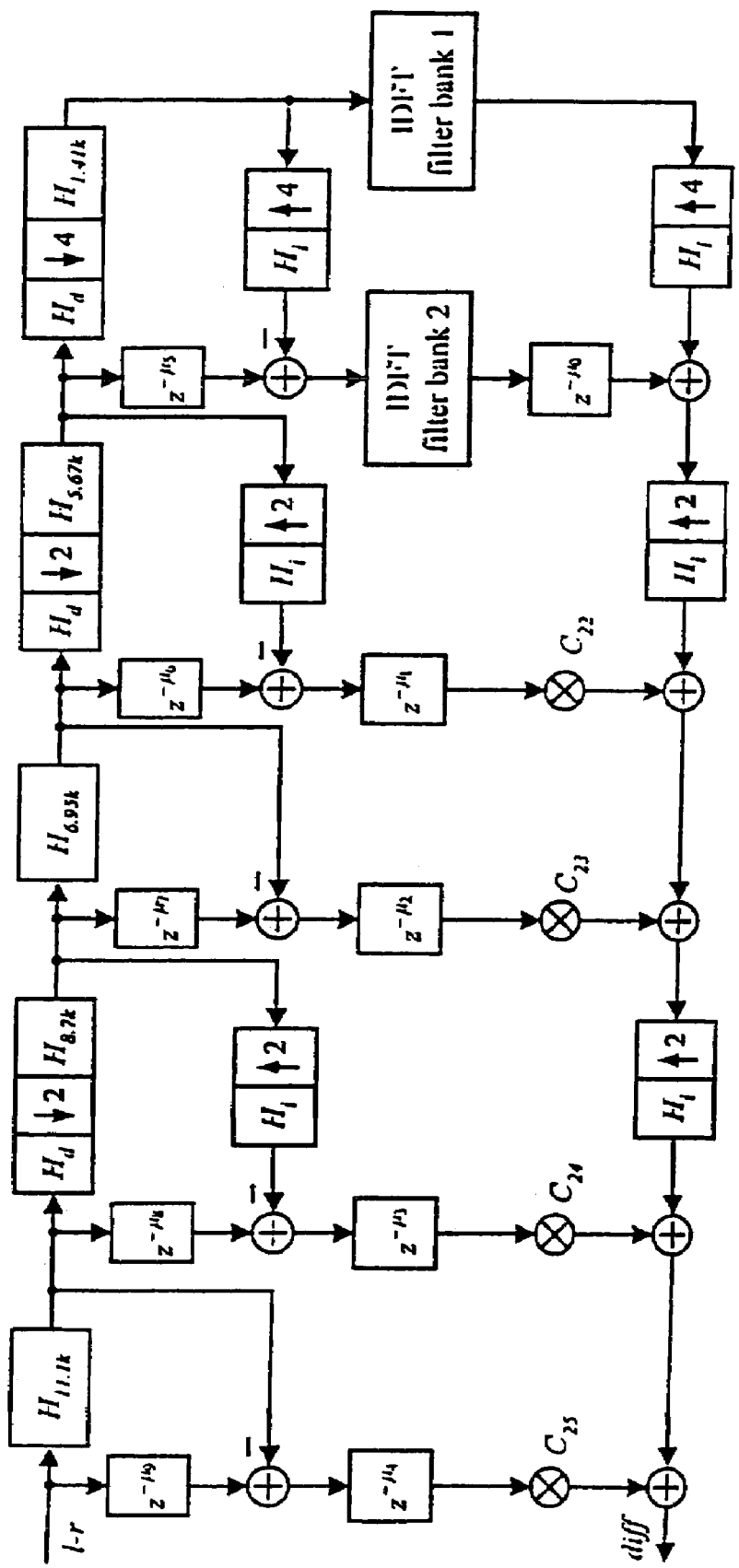
FIG. 2 shows a hybrid filter bank used in the digital receiver shown in FIG. 1.
Figure 3:
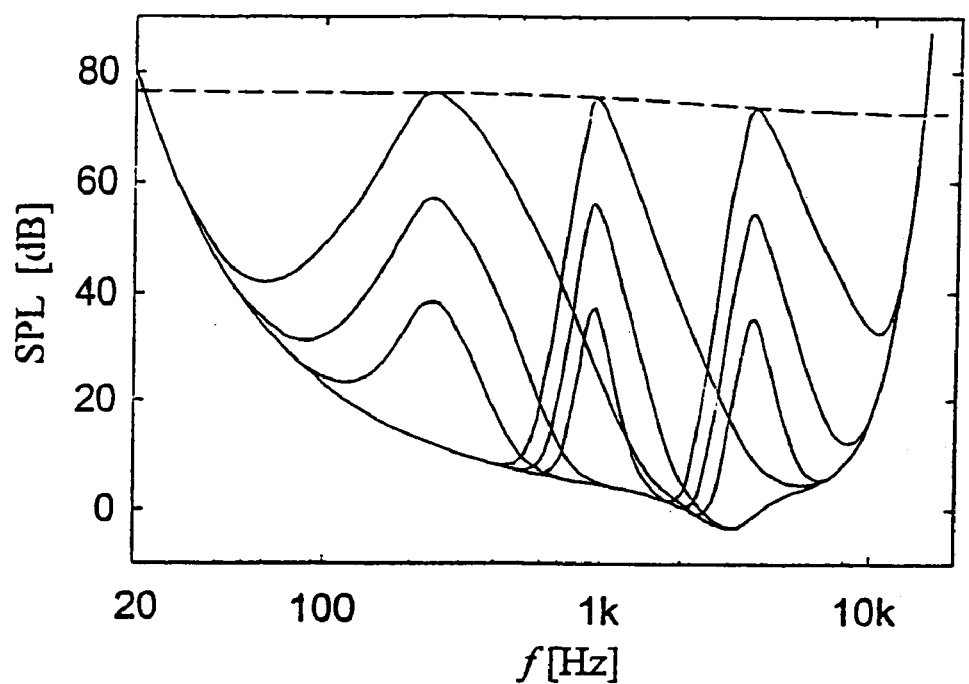
FIG. 3 shows the simultaneous masking of the human auditory system.

FIG. 2 shows a hybrid filter bank as realization of one of the first filter bank 1, the second filter bank 8 and/or the third filter bank 11.

The non-uniform filter bank for the band-splitting of the difference signal l−r must be linear phase and perfect reconstructing. To reduce the calculation power requirements, the filter bank should be split into an analysis and a synthesis filter bank with sampling rate decimated subband filter signals. The subband signals must not be critically sampled to avoid aliasing caused by the attenuation of subband signals. In N. J. Fliege, "Multirate Digital Signal Processing", Whiley & Sons, 1995 an oversampled, perfect reconstructing and linear phase filter bank is proposed. However, the frequency resolution of the proposed multicomplementary filter bank is too low to meet the requirements of the human auditory system.

FIG. 2 shows the combination of such a complementary filter bank with two interpolated DFT filter banks, as shown in R. E. Crochiere, L. R. Rabiner "Multirate Digital Signal Procesing", Prentice-Hall, 1983, to a 25-channel hybrid filter bank. This filter bank is better suited to meet the psychoacoustical model of the human auditory system.

As mentioned above, of course other filter banks fulfilling the described requirements might be used.

Therewith, a method and device for the optimal stereo to mono blending based on psychoacoustical models is realized according to the present invention. This leads to a huge performance gain especially in mobile receivers.

The system works reliable, independent from the reception situation. The detection of distortions caused by fading and multipath is reliable. The system is insensitive to crosstalk from the in phase to the in quadrature component of the 38 kHz subcarrier caused by low quality transmitters and/or narrow IF filtering.

The invention claimed is:

1. A method to reduce noise for a stereo signal comprising a stereo sum signal and a stereo difference signal to be used with a noise reducing device, said method comprising:
   dividing the stereo difference signal into a first plurality of subbands each subband covering a frequency band;
   dividing the stereo sum signal into a second plurality of subbands in a same manner as the stereo difference signal is divided in the dividing the stereo difference signal;

determining a signal component of the stereo signal in the frequency band of each of the first and second plurality of subbands;

determining a noise component of the stereo difference signal of each subband of said first plurality of subbands;

attenuating, with the noise reducing device, the subbands of the stereo difference signal with a noise component of a respective subband lying above a masking threshold of the stereo signal of the respective subband until the noise component of the respective subband lies below the masking threshold; and adding the corresponding stereo difference signal with the corresponding stereo sum signal from said first and second plurality of subbands.

2. The method according to claim 1, further comprising: determining a number of subbands included in each of the first and second plurality of subbands according to properties of the human auditory system.

3. The method according to claim 1, further comprising: determining a width of a respective subband included in the first and second plurality of subbands according to properties of the human auditory system.

4. The method according to claim 1, further comprising: determining an attenuation factor of a respective subband included in the first and second plurality of subbands, by dividing the signal component corresponding to the subband of the stereo difference signal by the noise component of the subband of the stereo difference signal.

5. The method according to claim 4, further comprising: limiting the attenuation factor of the respective subband to values between 0 and 1.

6. The method according to claim 4, further comprising: subtracting a respective influence factor from the attenuation factor of the respective subband to reduce influence of noise in the signal component to the attenuated signal.

7. The method according to claim 1, further comprising: determining the noise component of a subband of the stereo difference signal on basis of a noise power of the stereo difference signal, which is determined by filtering an in quadrature component of the stereo difference signal into the respective subband and rms filtering the corresponding subband.

8. The method according to claim 7, further comprising: determining the noise component of a subband of the stereo difference signal by weighting the noise power of the stereo difference signal, according to a respective corresponding absolute threshold of masking, a fieldstrength of a received fm signal, a volume of output sound, a background noise level, a signal amplitude power of the audio signal, a speed of a vehicle within which the stereo signal is reproduced, and/or a ratio of the signal power to the noise power of the difference signal of the corresponding subband.

9. The method according to claim 1, further comprising: determining the signal component corresponding to a subband of the stereo difference signal according to a fieldstrength of a received fm signal, a volume of output sound, a background noise level, a signal amplitude power of the audio signal, a speed of a vehicle within which the stereo signal is reproduced, and/or a ratio of the signal power to the noise power of the difference signal of the corresponding subband.

10. The method according to claim 9, further comprising: weighting a squared subband signal of an in phase component of the stereo difference signal with a weighting factor according to the fieldstrength of the received fm signal, a volume of output sound, a background noise level, the signal amplitude power of the audio signal, a speed of a vehicle within which the stereo signal is reproduced, and/or the ratio of the signal power to the noise power of the difference signal of the corresponding subband.

11. The method according to claim 1, further comprising: determining frequency selectivity by dividing the stereo difference signal into subbands.

12. A noise reducer for a stereo signal that includes a stereo sum signal and a stereo difference signal, comprising:

a first filter bank configured to split the stereo difference signal into a first plurality of subbands each covering a frequency band;

a second filter bank configured to split the stereo sum signal into a second plurality of subbands in a same manner as the first filter bank splits the stereo difference signal;

an attenuator configured to attenuate the subbands of the stereo difference signal which noise component lies above a masking threshold of a signal component of the stereo signal of the respective subband until the noise component of the respective subband lies below the masking threshold; and an adding unit configured to the corresponding stereo difference signal with the corresponding stereo sum signal from said first and second plurality of subbands.

13. The noise reducer according to claim 12, further comprising:

first multipliers configured to weight each of the subbands of the stereo difference signal with a respective corresponding control signal;

a first adder configured to sum all weighted subbands of the stereo difference signal to build a frequency selective weighted stereo difference signal; and a weighting factor determination unit configured to determine a respective control signal frequency selective based on the masking effect of the human auditory system, wherein the weighting factor determination unit is configured to obtain a number and width of the first plurality of subbands obtained via the first filter bank according to properties of human auditory system.

14. The noise reducer according to claim 13, wherein said weighting factor determination unit comprises:

a division unit configured to determine a ratio of a signal component of each of the subbands of the stereo signal to a noise component of each of the subbands of the stereo difference signal.

15. The noise reducer according to claim 14, wherein said weighting factor determination unit comprises:

a respective second adder configured to determine the control signal by subtracting a respective influence factor from the output signal of the division unit to reduce the influence of noise in the signal component to said control signal.

16. The noise reducer according to claim 13, wherein said weighting factor determination unit comprises:

a mixer and a first lowpass filter configured to determine the noise component of the stereo difference signal by deriving an in quadrature component of the stereo difference signal, and a third filter bank having the same characteristics as the first filter bank, configured to determine the noise component of each of the subbands of the stereo difference signal.

17. The noise reducer according to claim 16, wherein said weighting factor determination unit comprises:

a respective first rms determinator receiving a respective output signal of the third filter bank configured to determine the respective noise power corresponding to the respective noise component of a subband of the stereo difference signal.

18. The noise reducer according to claim 17, wherein said weighting factor determination unit comprises:
a second multiplier configured to determine the noise component of a subband of the stereo difference signal by weighting a respective noise power according to a respective corresponding absolute threshold of masking, a fieldstrength of a received fm signal, a volume of output sound, background noise level, a signal amplitude power of the stereo signal, a speed of a vehicle within which the stereo signal is reproduced, and/or a ratio of the signal power to the noise power of the difference signal of the corresponding subband.

19. The noise reducer according to claim 14, wherein said weighting factor determination unit comprises:
a fourth filter bank having basically the same characteristics as the first filter bank configured to determine the signal component of each of the subbands of the stereo sum signal corresponding to the first plurality of subbands of the stereo difference signal.

20. The noise reducer according to claim 19, wherein said weighting factor determination unit comprises:
a respective second rms determinator receiving respective corresponding output signals of the first filter bank, the fourth filter bank or the first and fourth filter banks, configured to determine the respective signal power corresponding to the signal component of each of the subbands of the stereo signal.

21. The noise reducer according to claim 20, wherein said weighting factor determination unit comprises:
a respective third multiplier configured to determine the signal component of each of the first and second plurality of subbands of the stereo signal by weighting the respective output signal of the first filterbank with a weighting factor according to a fieldstrength of the received fm signal, a volume of output sound, a background noise level, a signal amplitude power of the audio signal, a speed of a vehicle within which the stereo signal is reproduced, and/or the ratio of the signal power to the noise power of the difference signal of the corresponding subband.

* * * * *